United States Patent [19]

Zitz et al.

[11] 4,412,700
[45] Nov. 1, 1983

[54] SYSTEM FOR MONITORING THE MOVEMENT OF A CUTTING TOOL OF A TUNNEL-DRIVING MACHINE RELATIVE TO A DESIRED PROFILE

[75] Inventors: Alfred Zitz, Zeltweg; Erich Dröscher, Scheifling; Otto Schetina, Zeltweg, all of Austria

[73] Assignee: Voest-Alpine Aktiengesellschaft, Vienna, Austria

[21] Appl. No.: 255,636

[22] Filed: Apr. 20, 1981

[30] Foreign Application Priority Data

Apr. 21, 1980 [AT] Austria ............................ 2138/80
Oct. 14, 1980 [AT] Austria ............................ 5102/80
Oct. 14, 1980 [AT] Austria ............................ 5103/80

[51] Int. Cl.³ ............................................. E21D 9/10
[52] U.S. Cl. ........................................................ 299/1
[58] Field of Search ............................................ 299/1

[56] References Cited

U.S. PATENT DOCUMENTS 4,023,861 5/1977 Schnell .................................. 299/1
4,027,210 5/1977 Weber ................................ 299/1 X Primary Examiner—Ernest R. Purser
Attorney, Agent, or Firm—Cushman, Darby & Cushman

[57] ABSTRACT

The system for monitoring the movement of a cutter arm and of the cutting tools rotatably mounted on said cutter arm in a tunnel-driving machine comprises a receiver (13), which has a sighting device (14) that is mounted to be displaceable and pivotally movable transversely to the longitudional axis of the tunnel-driving machine. The movement of the receiver (13) to a position in alignment with a guide beam (3) is transmitted to a simulator, which contains a model (62) of the desired profile and in which a three-dimensional scale model (54) of the cutting tool is mounted to be pivotally movable and displaceable analogously to the receiver (13) (FIGS. 4 to 11).

17 Claims, 19 Drawing Figures

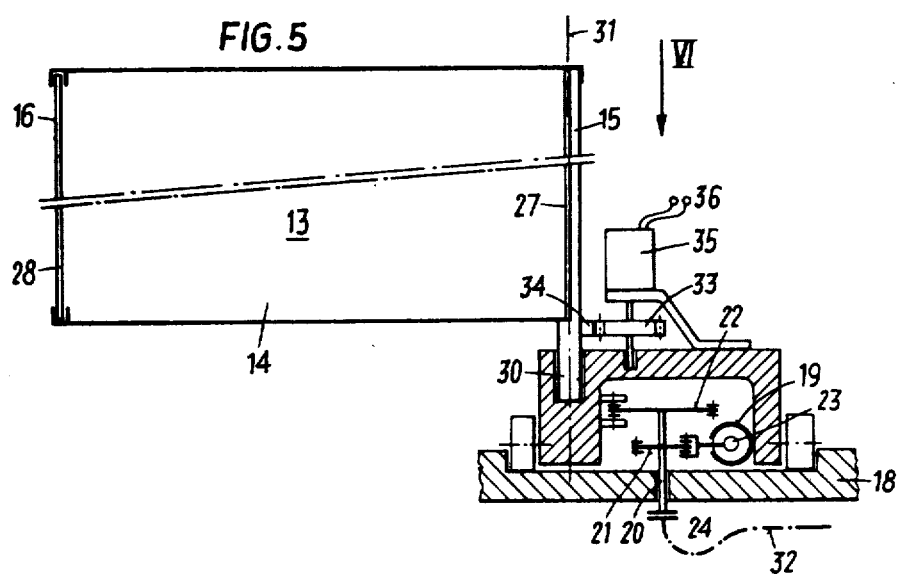
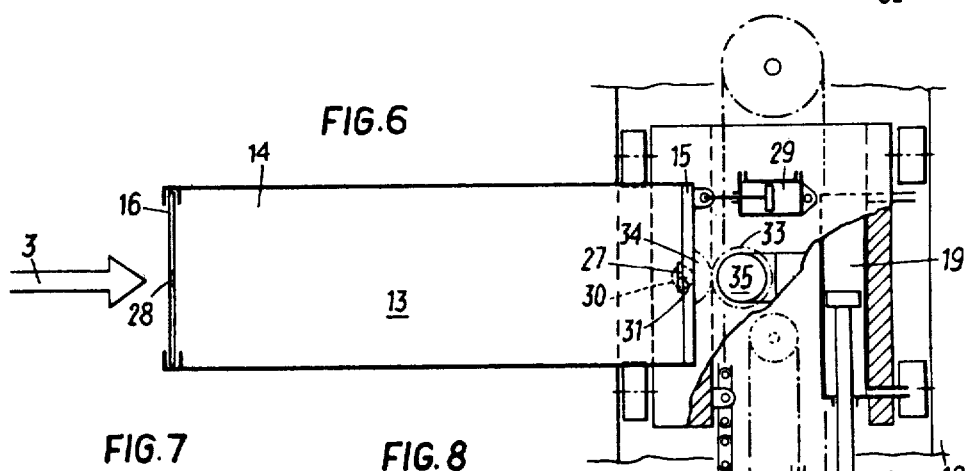
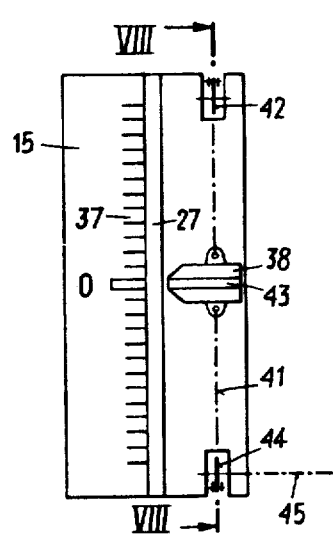
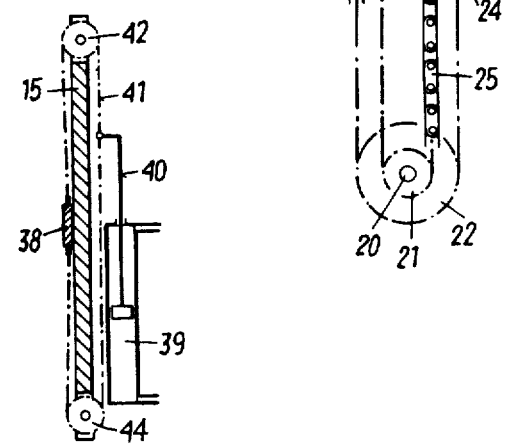

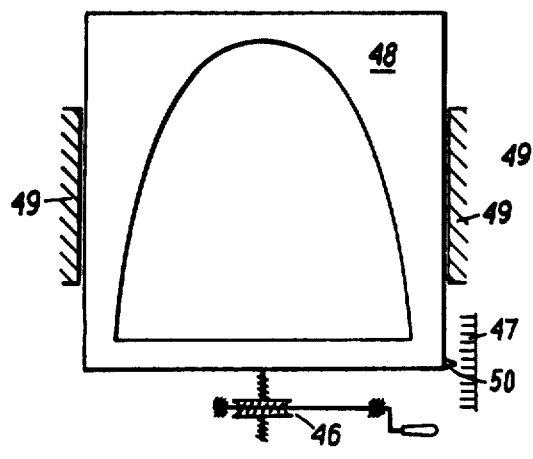
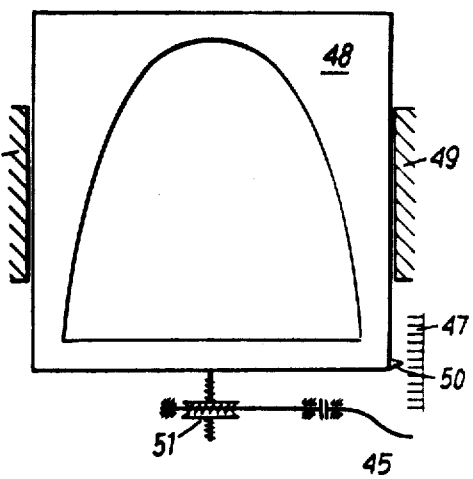
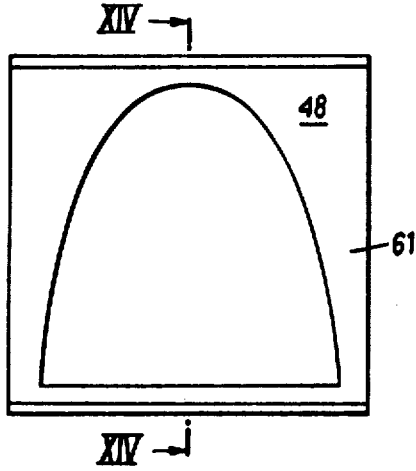
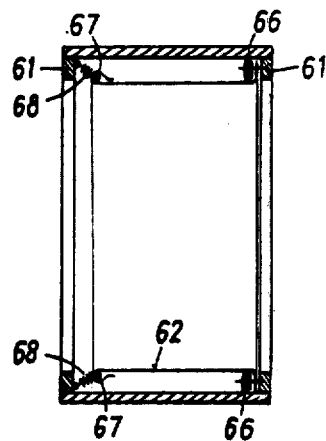
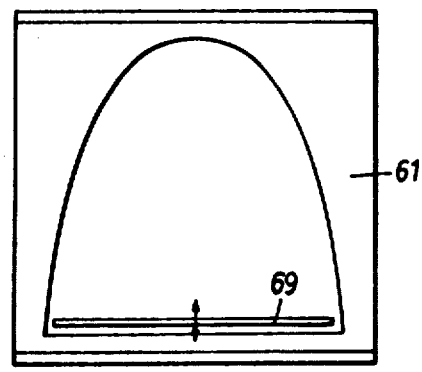

SYSTEM FOR MONITORING THE MOVEMENT OF A CUTTING TOOL OF A TUNNEL-DRIVING MACHINE RELATIVE TO A DESIRED PROFILE

BACKGROUND

This invention relates to apparatus for checking the movement of a pivoted tool of a tunnel-driving machine, which tool is rotatably mounted on a pivoted cutter arm and freely movable over a breast, relative to a desired profile of the tunnel to be driven, wherein a focussed electromagnetic wave train, which is aligned with the axis of the tunnel, is used as well as a receiver mounted on the tunnel-driving machine. In known apparatus of that kind, one receiver or a plurality of receivers is or are fixed to the tunnel-driving machine and one laser beam or a plurality of laser beams is or are employed and it has been endeavored to obtain by trigonometric calculations a representation of the coordinates of the cutter head relative to the coordinates of a desired profile of the tunnel to be driven. Specifically, a laser beam receiver has already been proposed which comprises a number of light-sensitive elements distributed on a surface. These light-sensitive elements, which were relatively small, were preceded in the direction toward the transmitter by a template or another plate, which carried light sensitive elements. The detection of those light-sensitive elements which received the laser beam at a given time permitted a conclusion regarding the position of the tunnel-driving machine relative to the axis of the tunnel. The known system of that kind requires a high expenditure for calculation and owing to the large number of light sensitive elements required for the calculation is rather susceptible to trouble. This susceptibility to trouble is particularly due to the fact that the operation of the light-sensitive elements may be strongly affected by dust, shakes and high temperatures and that regulations issued by mining authorities permit only laser beams of very low intensity to be used in order to avoid firedamp explosions.

SUMMARY OF THE INVENTION

It is an object of the invention to provide a simple system which is of the kind described first hereinbefore and which without need for complicated calculations permits in a simple manner a representation of the coordinates of the cutting tool relative to the desired tunnel to be driven and wherein the fact that owing to the varying distances of the vertical and horizontal axis of rotation of the cutter arm from the breast the cutting tool moves at the breast substantially within a portion of an ellipsoid of revolution rather than in a plane surface can be taken into account. This object is accomplished in accordance with the invention essentially in that the receiver is displaceable transversely to the longitudinal axis of the tunnel-driving machine and is mounted to be pivotally movable from a position in which it is parallel to the longitudinal axis of the tunnel-driving machine to a position in which the receiver is aligned with the axis of the focussed electromagnetic wave train, and that the parallel displacement and/or pivotal movement of the receiver and the pivotal movement of the cutting tool relative to the tunnel-driving machine are transmitted to a simulator, which comprises a model of the desired profile of the tunnel and a model of the cutting tool. In this arrangement, a single sensor element is sufficient and the displacement and pivotal movement of the receiver can be transmitted simply and without need for complicated trigonometric conversions to the movement of a model of the cutting tool in a simulator. If a three-dimensional model of the cutting tool is used in a preferred arrangement, it will no longer be necessary to convert the actual coordinates of the cutter head on the breast to corresponding coordinates in a plane; such coordinates are usually required where the usual display devices are used. The invention is based on the fact that a rotation of the tunnel-driving machine toward the bottom about any pivotal axis, which is usually unknown, can be resolved into a rotation about a preselected point of the tunnel-driving machine through the same angle and a parallel displacement of that point.

The monitoring system is preferably so designed that the model of the cutting tool in the simulator consists of a three-dimensional model, which is fixed to three-dimensional models of the swivelling mechanism and of the cutter arm, that the model of the swivelling mechanism is displaceably and/or pivotally mounted, that the model of the cutter arm is mounted to be pivotally movable like the cutter arm, and that the models of the swivelling mechanism and of the cutter arm are adapted to be driven by adjusting drives, which are connected to sensors for detecting the extent of the displacement and/or the angle of the pivotal movement of the receiver and the cutter arm. That design affords the advantage that for a representation of the position of the cutter head relative to the desired profile of the tunnel it will be sufficient to transmit the scaled-down movement of the receiver and of the cutter arm to the three-dimensional models of the swivelling mechanism and of the cutter arm without any mathematical conversion.

Because any misalignment of the tunnel-driving machine relative to the longitudinal axis of the tunnel will have the result that the cutter head when viewed in the longitudinal direction of the tunnel will sooner or later reach the boundary of the desired tunnel, it will be of advantage if the model of the desired profile of the tunnel in the simulator consists of a three-dimensional model of that portion of the desired tunnel which is near the breast. That design will result in the closest agreement between the actual position of the cutter head relative to the desired profile of the tunnel and the simulation of that position in the simulator.

The receiver may simply comprise an elongated sensor element, which extends transversely to the longitudinal axis of the tunnel-driving machine and particularly in the vertical direction and the receiver may be pivoted on the longitudinal axis of the sensor element. Because the sensor element is pivoted on its longitudinal axis, the receiver can be pivotally moved into alignment with the axis of the focussed electromagnetic wave train, consisting particularly of a light beam or laser beam, and that pivotal movement will be analogously transmitted to the models of the swivelling mechanism and of the cutting tool. Because only rotations in a horizontal plane can be represented by that pivotal movement, the sensor element must consist of a vertically elongated sensor element so that it can detect vertical deviations of the machine position. If the sensor element consists of reflecting material, the incidence of the light beam or laser beam at a point which is spaced from the center of the receiver can be clearly recognized and such deviations can be correctly transmitted to the simulator simply in that the tunnel model is vertically displaced. For this purpose, a graduated scale extending in the longitudinal direction of the sensor element is preferably arranged beside that sensor element of the receiver and a pointer is preferably provided, which is displaceable and guided along that scale, the model of the desired profile of the tunnel is mounted in the simulator to be vertically displaceable, and the vertical displacement of the desired profile is preferably coupled to the displacement of the pointer along the vertical scale of the receiver.

In order to ensure that the receiver will be aligned with the axis of the laser beam or light beam in case of horizontal rotations, the receiver is provided with a sighting device, which precedes the receiver in the direction toward the transmitter and consists, e.g., of a slot that is parallel to the longitudinal axis of the sensor element and is preferably defined by parts which are permeable to the electromagnetic waves. Those portions of the sighting device which define the slot will attenuate the beam relative to its intensity in the position in which the undivided light beam or laser beam passes through the slot. In that case the sensor element will deliver the largest signal when the receiver is aligned with the axis of the light beam or laser beam.

The displacement and pivotal movement are preferably imparted to the receiver by an adjusting hydraulic drive and in a particularly desirable arrangement the receiver is displaced by means of an interposed chain drive. In that case the adjusting hydraulic drive may be small and the adjusting movement may be transmitted at a suitable ratio by means of the chain drive. The chain drive permits also the use of a flexible shaft, which is connected to one chain sprocket, for transmitting the adjusting movement to the model of the swivelling mechanism. The adjusting movement of the receiver can be transmitted to the model of the swivelling mechanism in the simulator in a simple manner by rotary pontentiometers, angle encoders, inclinometers, angular position detectors, positioning motors, stepping motors or flexible shafts or the like. In any case, digital or analog electric signals will be proportionally transmitted or a simple mechanical transmission will be used but there will be no need for a mathematical correction.

In a particularly desirable manner the inscribed envelope or enveloping surface of the desired profile or of the model of the tunnel in the simulator and the model of the cutter head may be electrically conductive and be electrically connected to a visual and/or audible signal generator. In that case the arrival at the desired profile of the tunnel will be reliably indicated. Because a movement beyond that desired profile should be possible from time to time, if desired, the model of the desired profile or of the tunnel in the simulator consists preferably of elastically yieldable material. Alternatively, the model of the desired profile of the tunnel or the model of the tunnel may be resiliently mounted to prevent damage to the simulator in such case.

The system according to the invention permits a simple superposition of the position of the cutting tool relative to the tunnel-driving machines on the instantaneous position of the tunnel-driving machine. If the required structural expenditure is tolerated, the model of the tunnel may also be mounted so that it will be displaceable and pivotally movable relative to the model of the cutter head because it is sufficient to simulate in the simulator the position of the cutting tool relative to the tunnel.

A simple and correct indication of incorrect positions of the tunnel-driving machine caused by an uphill or downhill grade or a roll angle of the machine will be obtained if the three-dimensional model of the swivelling mechanism is pivoted on a pivotal axis, preferably by means of a universal joint. If the three-dimensional model of the swivelling mechanism is pivoted on a pivotal axis the detected angular misalignment can be transmitted to the model of the swivelling mechanism. Because the pivotal axis is a defined point of the simulator and, as a rule, is an equivalent pivotal axis a parallel displacement must be effected, too. In agreement with the teaching given in the parent patent regarding deviations in the horizontal plane, the parallel displacement for correcting the indication of the vertical deviation is effected by a vertical displacement of the model of the desired profile. It is much easier to vertically displace the desired profile than to impart an analogous displacement to the model of the swivelling mechanism.

In accordance with a preferred further feature of the invention, the model of the swivelling mechanism is pivotally suspended from a pivot in the simulator and the movable parts of the model of the swivelling mechanism and of the model of the cutter arm are statically balanced. In that case it will not be necessary to detect the uphill or downhill angle and roll angle because these angles will be directly detected by the pendulum movement of the model of the swivelling mechanism. In such an arrangement the model of the swivelling mechanism is preferably suspended by means of a universal joint so that the uphill angle and roll angle can be detected simultaneously. In that case, the model or the swivelling mechanism will be adjusted relative to the model of the tunnel profile by an angle which equals the angular misalignment of the cutting machine. Within the scope of the invention the suspension of the model of the swivelling mechanism from a pivot can be replaced by the use of at least one proportional drive, particularly a hydraulic or electric adjusting motor, for driving the model of the swivelling mechanism. In that case, separate inclinometers, angle encoders or the like will be required for a measurement of the roll angle and of the uphill or downhill angle and the means for driving the model of the swivelling mechanism will be adjusted in proportion with the values measured by said instruments. The required parallel displacement can be imparted to the model of the desired profile in that the vertical point of incidence of a laser beam is detected and the template for the tunnel profile is displaced accordingly, as has been described in the parent patent.

If it is desired to drive relatively long portions of the tunnel at a predetermined uphill or downhill angle, it will be desirable to pivot the entire simulator on the tunnel driving machine on an axis which is parallel to the transverse axis of the tunnel-driving machine and to provide means to fix the simulator in its adjusted angular position. If the model of the swivelling mechanism is suspended from a pivot and the entire simulator is set at a predetermined angle, the required compensation will be automatically effected. Similarly, if at least one proportional drive for imparting the pivotal movement to the model of the swivelling mechanism is provided, the zero position of the transducers can be adjusted so that the desired compensation will be automatically obtained.

In accordance with a further preferred feature of the invention, a modified system of the kind described first hereinbefore is proposed, which can be used in case of need for a movement beyond the desired profile of the tunnel and a more specific indication of the extent by which the desired profile has been exceeded can be obtained direct from the simulator. For that purpose, the model of the cutter arm consists of a tube and a rod which extends through one end of the tube, the model of the cutter head is connected to the free end of the rod, the tube is pivoted to the model of the swivelling mechanism, and the rod is mounted so that it can be moved out of its central position, in which it is coaxial to the tube, under the action of forces exerted on the model of the cutter head. Because the model of the cutter arm consists of two parts, all indications provided in accordance with the parent patent can be obtained by a pivotal movement of the tube which constitutes one part of the model of the cutter arm. If the cutter head closes an electric contact when it collides with the model of the desired profile or the envelope of the desired profile the resulting signal will indicate the arrival at the boundary of the desired profile. But the proposal according to the invention will permit a further pivotal movement of the model of the cutter arm even if the envelope of the tunnel profile consists of a rigid tube so that it has a high stability and reliability in operation. In that case, in accordance with the present invention the rod will be moved out of the central position, in which it is coaxial to the tube, and the means for driving the model of the cutter arm cannot be damaged.

In accordance with a further preferred feature of the monitoring system according to the invention, the inscribed envelope or envelope surface of the desired profile in the simulator, the model of the cutter head are electrically conductive and electrically conductive and electrically connected to a visual and/or audible signal generator and the rod as well as the model of the cutter head are electrically conductive and connected to a voltage source at least in that region which can collide with the open end of the tube or the envelope surface of the desired profile and a lead connected to the open end of the tube is connected to a signal generator which is separate from the signal generator associated with the envelope surface of the desired profile. In that case the response of the second signal generator will indicate that the desired profile has been exceeded to a predetermined extent. That second signal will be initiated by the collision of the rod with the open end of the tube. The distance between the rod and the contact-making surface of the tube can be adjusted in a simple manner if an annular disc of electrically conductive material is mounted on the end of the tube and is dimensioned in accordance with the permissible extent to which the profile may be exceeded.

In a particularly simple embodiment of the invention the rod extending through the tube is gripped inside the tube and consists of a flexible rod. With such flexible rod, the system will be highly reliable in operation because the simulator will not be damaged even when the desired profile to be cut has suddenly been exceeded to a large extent.

BRIEF DESCRIPTION OF THE DRAWING

The invention will now be explained in more detail with reference to illustrative embodiments shown on the drawing, in which

FIG. 5 is a longitudinal sectional view showing the receiver.

FIG. 6 is a partly sectional elevation as viewed in the direction of the arrow VI—VI in FIG. 5.

FIGS. 7 and 8 show an embodiment of a receiver for detecting vertical deviations of the machine.

FIG. 8 being a sectional view taken on line VIII—VIII in FIG. 7.

FIGS. 9 and 10 show embodiments of the tunnel profile model in the simulator.

FIGS. 13 and 14 show an embodiment of the three-dimensional model, used in the simulator, of that portion of the desired tunnel which is adjacent to the breast.

FIG. 15 is a modification of the embodiment of FIGS. 13 and 14 with a vertically adjustable bottom model.

DETAILED DESCRIPTION

Figure 1:
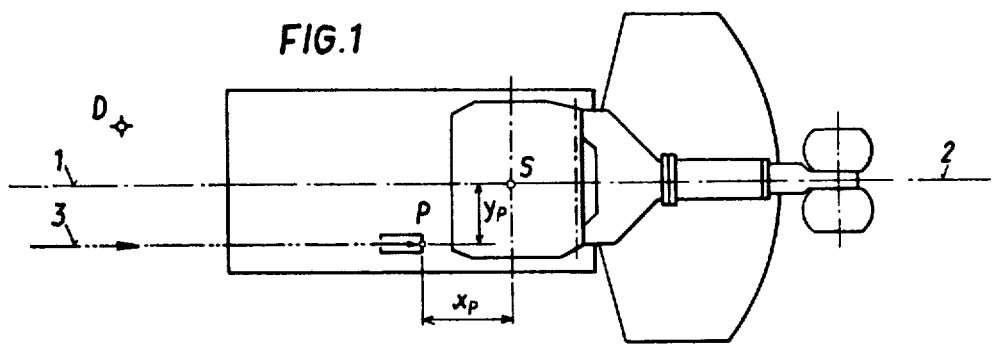
FIGS. 1 to 4 are top plan views showing a tunnel-driving machine and illustrating the movements by which the receiver is adjusted in response to rotational movements or parallel displacements within a horizontal plane.
Figure 2:
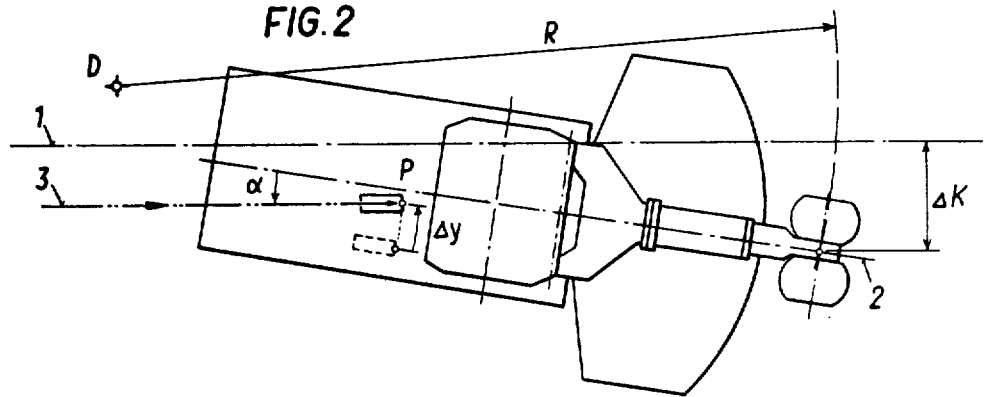

In FIGS. 1 and 2, it is assumed that the machine shown in a top plan view is rotating about an axis D in a horizontal plane. As long as the machine is in its desired position, the longitudinal axis 1 of the tunnel and the longitudinal axis 2 of the machine coincide. A beam 3 from a laser, which is disposed behind the machine, is incident on a thus marked point P of the machine. With reference to the axis S of horizontal rotation that point P has the coordinates $x_p$ and $y_p$. During a rotation of the entire machine, the center of the cutter head will rotate about the axis D with a radius R so that a horizontal deviation $\Delta K$ relative to the tunnel axis will result. Because the axis of rotation D is virtually never known, $\Delta K$ must be determined by a suitable method. A rotation about D can be substituted by a parallel displacement of the machine by the amount $\Delta y$ and a subsequent rotation by the angle $\alpha$ about the point P, which now has the coordinates $x_p$ and $(y_p - \Delta y)$. A comparison of the positions of the center of the cutter head in both methods will show that the equivalent rotation will result in a difference in the longitudinal direction of the tunnel compared to the actual rotation but exactly the same value will be obtained in a direction which is transverse to the longitudinal direction.

Because the longitudinal direction of the tunnel is identical to the direction of advance, that method will provide in spite of the above-mentioned difference a full equivalent of the actual movement of the machine. The distance $\Delta y$ by which the point P must be displaced so that it will again be disposed in the laser beam is the extent of the parallel displacement of the machine and the rotation by the angle $\alpha$ about the point P required to move the receiver into the laser beam is the angular misalignment of the machine. These two values are basically required to ascertain the position of the cutter head and to simulate that position in the simulator.

Figure 3:
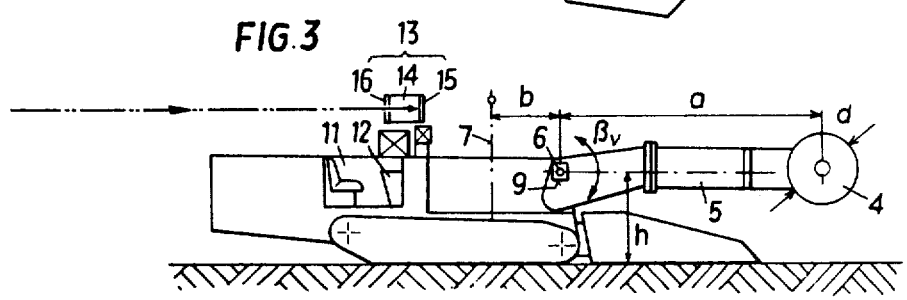
Figure 4:
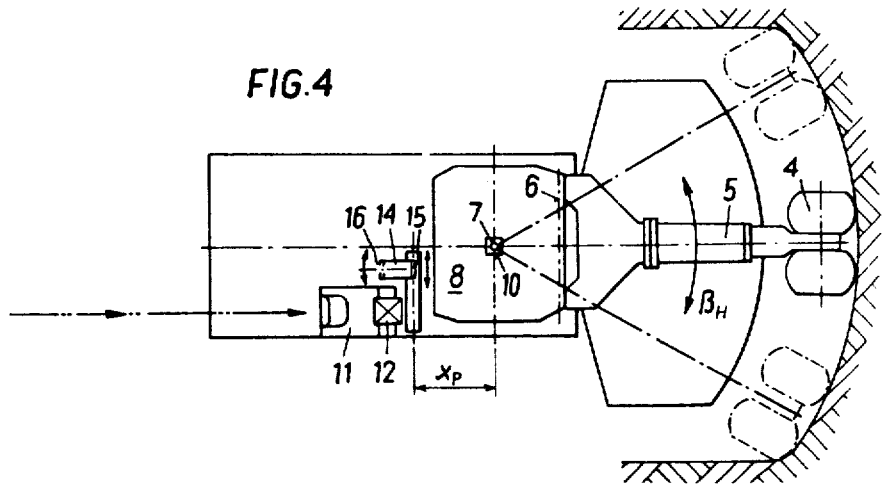

FIGS. 3 and 4 represent the tool proper, which consists of the rotatably mounted cutter head 4, which is disposed at the foremost end of the cutter arm 5. The cutter arm is mounted to be rotatable in a vertical plane about the pivotal axis 6 by an angle $\beta_V$ and to be rotatable in a horizontal plane about the pivotal axis 7 by an angle $\beta_H$.

The components required for the pivotal movements and the mounting are combined in a swivelling mechanism 8. Goniometers 9 and 10 are disposed in the two axes 6 and 7 of the swivelling mechanism and deliver a certain analog or digital signal representing a given angle. The driver's stand is indicated at 11. The simulator 12 and the receiver 13, which constitutes a sighting device, are disposed over the driver's stand.

In the top plan view shown in FIG. 4, the displaceable and rotatable element 14 of the sighting device (rear and front sights) is shown offset from the zero position. The two possible movements are indicated by double-headed arrows.

When the machine leaves its desired position owing to the reaction forces acting on the cutter head or to a deviation of the running gear of the machine from the desired course, the laser beam 3 will no longer be incident on the target 15 of the receiver 14 in the desired line (front sight). This can be visually detected by the driver, who can then move the part 14 by a drive, e.g., a hydraulic drive, so that the rear sight and the laser beam again coincide. If the deviation of the machine is strictly a parallel displacement, that movement will be sufficient. If there is also an angular misalignment between the tunnel axis 1 and the laser beam 3, on the one hand, and the machine axis 2, on the other hand, the part 14 must be rotated as described hereinbefore until the laser beam falls again through the vertical slot of the sighting device 16 and is freely incident on the target 15.

The angle of the movement required for this purpose is the angle $\alpha$ between the machine axis and tunnel axis. That angle is measured and transferred to the simulator.

The basic design of the receiver is shown in FIGS. 5 and 6. A base frame 17 is slidable in a track 18 transversely to the longitudinal axis of the machine by means of a hydraulic actuator 19 and a chain drive. The latter may comprise a common shaft 20, which carries a small chain sprocket 21 and a chain sprocket 22 which is larger by a certain ratio so that the stroke of the actuator will be increased by that ratio.

As a result, the entire actuator can be accommodated within the space between the two chain sprockets 22. A hand lever may be provided by which the driver can control in known manner a directional valve for controlling the direction in which pressure fluid is supplied to the actuator 19. The movement of the piston is transmitted by the piston rod 23 and the coupling element 24 to the chain 25 and is increased in speed by the two chain sprockets fixed to the common shaft 20 and is transmitted by the chain 26 to the base frame 17.

It is apparent that by the actuation of a hand lever the driver can cause the base frame 17 to move transversely to the machine axis 2 until the laser beam 3 coincides with the sight line defined by the elongated sensor element 27 (front sight) on the target 15. This will also be possible if in case of a deviation the laser beam does not pass through the slot 28 (rear sight) of the sighting device, provided that the part 16 which defines the slot 28 consists of light-permeable material. As soon as the laser beam is incident at 27, the driver interrupts the displacing movement and causes pressure fluid to be supplied to the hydraulic actuator 29 by means of the same or another directional valve. As a result, the receiver 13 is rotated in the bearing 30 about an axis of rotation 31. As that axis of rotation coincides with the axis of the sensor element 27, the position of the latter will not be changed and the sensor will still be able to detect the incident laser beam. By means of the actuator 29 the part 14 is now pivotally moved about the axis of rotation 31 until the laser beam 3 can pass through the vertical slot 28 undividedly. As soon as this is the case, the driver interrupts the pivotal movement.

The displacement and the pivotal movement must now be measured so that the indication is correspondingly corrected. For this purpose a flexible shaft 32 is coupled to the shaft 20 and transmits the required number of revolutions of the chain sprocket 22 to the simulator. The angular movement is most suitably measured by being transmitted by means of a gear 33 and a gear segment 34 to a goniometer 35. In dependence on the angular movement, the goniometer 35 delivers at its output terminals 36 a corresponding electric analog signal or a corresponding number of pulses or a corresponding code number so that an adjusting movement can be effected in the simulator.

To supplement FIGS. 5 and 6, FIGS. 7 and 8 show how, by way of example, a vertical deviation of the machine can be detected by means of the sighting device.

The target 15 of the receiver 13 is shown in front elevation in FIG. 7 and comprises a scale 37 beside the sensor element 27. From that scale the driver can read the value corresponding to the point of incidence of the laser beam. If that scale reading is decreased by the scale factor M used for the models of the swivelling mechanism and tunnel, the extent will be approximately obtained by which the vertical indication in the simulator will have to be corrected. The scale division amounts preferably to M millimeters.

In accordance with FIG. 8, a pointer 38 is disposed beside the scale 37 and is vertically displaceable, via a deflecting sprocket 42, a chain 41 and a piston rod 40 of a hydraulic actuator 39, which is controlled by a hand lever. If the laser beam is incident on the sensor element 27, i.e., on the sight line, but is displaced from the zero line, the pointer 38 must be moved until its mark 43 is on the same lever as the laser beam. The distance travelled to that position from the zero line is a measure of the vertical deviation of the machine. That measure can be read from the wheel 44 and be transmitted by a flexible shaft 45 to the simulator, as is shown in FIG. 10.

FIGS. 9 and 10 show two embodiments of the model of the tunnel profile designed to take a vertical deviation of the machine into account. In FIG. 9 it has been assumed that only the scale 37 is provided on the target 15 beside the target line 27 and has preferably a scale division of M millimeters. If a vertical deviation of the machine causes the laser to be incident at a given scale graduation, the corresponding reading must be taken by the driver and be set on the scale 47 by means of the hand-operated drive 46. For this purpose the model 48 of the desired tunnel is mounted in two lateral tracks 49 and the value which has been set at the scale is indicated by a pointer 50. The scale division is preferably 1 mm so that each graduation of the scale 47 corresponds to a graduation of the scale 37.

FIG. 10 shows a basically similar arrangement of a tunnel template with the difference that the vertical correction is effected automatically rather than by hand. For this purpose the adjusting drive 51 having the transmission ratio $i=M$ is connected by a flexible shaft 45 to the chain sprocket 44 of the sighting device of FIGS. 7 and 8 so that the correcting movement imparted to the pointer 38—that correcting movement has been described with reference to FIGS. 7 and 8—is transmitted to the tunnel template 48 and scaled down by the factor M.

The basic design of a simulator is shown in FIG. 6. The active part is the model of the swivelling mechanism. The model of the desired tunnel is stationary. Alternatively, the correcting movements for compensating the deviations of the machine may be transmitted to the model of the desired tunnel or the correction effected in respect of the rotation of the machine may be imparted to the tunnel model and the correction effected in respect of the horizontal parallel deviation of the machine may be imparted to the model of the swivelling mechanism. As the parallel deviation is measured transversely to the machine rather than to the longitudinal axis of the tunnel, an exact simulation will be obtained if the displacement in the simulator is also effected transversely to the longitudinal axis of the model of the swivelling mechanism. If the displacement is effected transversely to the longitudinal axis of the tunnel model, the resulting arrow will be proportional to the cosine of the angle $\alpha$.

As $\alpha$ can be expected to remain relatively small, it is permissible to neglect that error.

Figure 11:
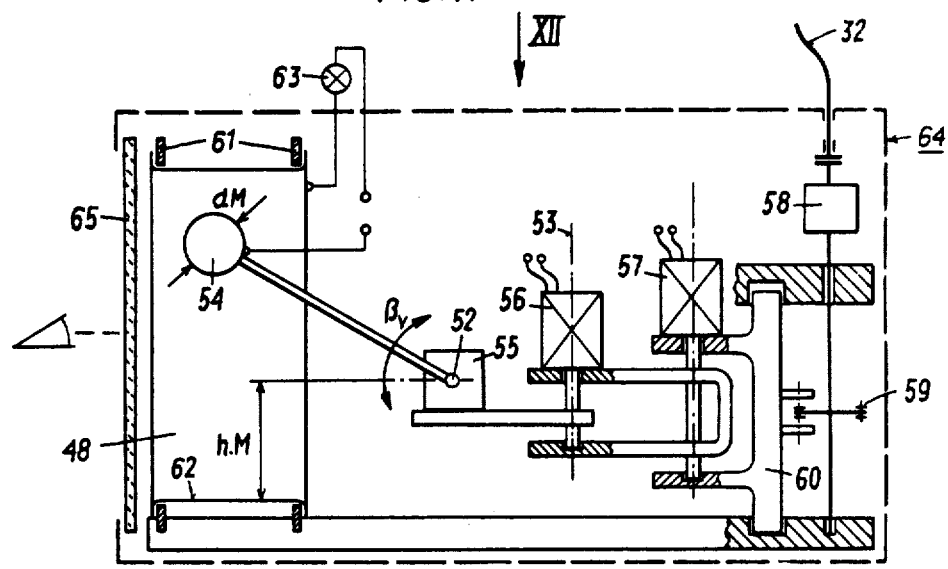
FIGS. 11 and 12 show the simulator in FIG. 11 in a longitudinal sectional view and in FIG. 12 in a partly sectional elevation as viewed in the direction of the arrow XII—XII in FIG. 11.

FIG. 11 shows the model of the desired tunnel, the model of the swivelling mechanism, the model of the cutter arm and the model of the cutter head, also the carrier (carriage) for the swivelling mechanism and the corresponding drive means. The dimensions and angles have been designated just as in FIGS. 1 to 4.

Because the swivelling mechanism of the machine defines a pivotal axis 6 for a vertical pivotal movement and a pivotal axis 7 for a horizontal pivotal movement, the model of the swivelling mechanism defines corresponding pivotal axes 52 and 53, about which the model 54 of the cutter head is pivotally movable at the same time. If the goniometers 9 and 10 (FIGS. 3, 4) deliver to the adjusting drives 55 and 56 signals which correspond to the respective angles these adjusting members will be at the angles $\beta_V$ and $\beta_H$, which corresponds to the actual angular positions of the cutter arm. As a result, the model 54 of the cutter arm will always assume in the model 48 of the desired tunnel exactly the position assumed by the actual cutter head 4 in the tunnel to be driven as long as the machine is in the desired position.

If the machine deviates in a horizontal plane from its desired position, any deviation can be represented by a parallel displacement of the point P by $\Delta y$ and by a rotation of the machine about the point P through an angle $\alpha$. These two parameters $\Delta y$ and $\alpha$ are measured with the aid of the sighting device shown in FIGS. 5 and 6 and are transmitted to the simulator. In this operation the measured angle $\alpha$ is transmitted by the goniometer 35 to the adjusting member 57 so that the models of the swivelling mechanism, cutter arm and cutter head will be rotated about the point P by the angle $\alpha$ so that the relative movement between the models of the cutter head and tunnel will be the same as the relative movement between the cutter head and tunnel.

If a parallel displacement $\Delta y$ is imparted to the point P simultaneously with the rotation through the angle $\alpha$ or alone, that displacement must be transmitted on a scale reduced by the factor M to the model of the cutter head. For this purpose the parallel displacement which has been measured with the aid of the sighting device is transmitted by a flexible shaft 32 to a transmission 58, which has the transmission ratio M, and is then transformed back to a linear movement, e.g., by means of a chain drive 59. As a result, the carrier 60 carrying the entire model of the swivelling mechanism and also the pivotal axis P' are displaced transversely to the longitudinal axis 1' by the distance M so that the relative movement between the models of the cutter head and the tunnel is the same as the relative movement between the cutter head and the tunnel.

The tunnel model 48 consists of two profile templates 61, which are spaced apart by a distance which is at least as large as the projection of the pivotal movement of the cutter head model on the longitudinal axis 1'. These two profile templates have an aperture which has the configuration of the desired profile FIGS. 9 and 10). A flexible sheet 62 extends between the two profile templates and defines the envelope surface of a short portion of the tunnel to be driven. That sheet is electrically conductive or has an electrically conductive surface so that it can cooperate as an electric contact with the electrically conductive surface of the cutter head model. In this case, the contact between the cutter head model and the sheet which represents the tunnel contour may initiate a visual or audible signal 63, which indicates to the driver that the profile boundary has been reached.

The entire simulator is accomodated in a protective housing 64, which is closed by a transparent pane 65 on the side facing the driver. When that pane has been removed, the entire tunnel model 48 can be removed and be replaced by another template, which represents, e.g., another desired profile. The cutter head model can also easily be replaced by one which corresponds to the cutter head which is actually used.

FIGS. 13 and 14 show an embodiment of a tunnel model for use when a sheet 62 having the required elasticity is not available. In that case the sheet 62 is secured to one of the profile templates 61, e.g., by means of a peripheral clamping bar 66 and to the second profile template by means of a peripheral annular wire 67 and a plurality of springs 68. With that arrangement, even a sheet which is inextensible or has only a small extensibility will permit the cutter head model to move beyond the profile boundary so as to bulge the sheet at the point of contact, and the sheet will return to the desired configuration when the cutter arm model has been swung back.

It is apparent from FIG. 15 that the bottom 69 of the tunnel model may be vertically adjustable so that the cutter head can be moved in a simple manner above or below the zero line of the tunnel profile.

Figure 16:
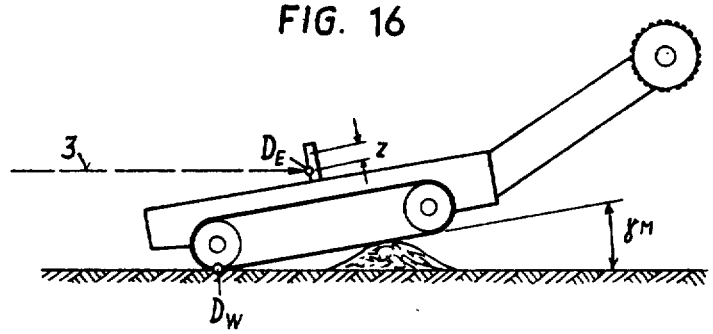
FIG. 16 is a view that is similar to FIGS. 1 to 4 and diagrammatically represents the geometry of the means for compensating uphill and downhill grades.

It is apparent from FIG. 16 that the rotation of the machine about the actual pivotal axis $D_W$ can be resolved into a rotation about the equivalent axis of rotation $D_E$ and a parallel displacement z of that axis in order to take an uphill angle $\gamma_M$ into account. That parallel displacement z is to be simulated in the simulator by a vertical parallel displacement of the tunnel template and will correspond to the vertical displacement of the point at which the laser beam 3 is incident on the receiver. The angles are so small that a correction by the factor $\cos \gamma_M$ is not required. The parallel displacement of the tunnel template can be effected in the manner shown in FIGS. 7 to 10 of the parent patent. The uphill angle can be taken into account in the simulator in the ways shown in FIGS. 17 and 18.

Figure 17:
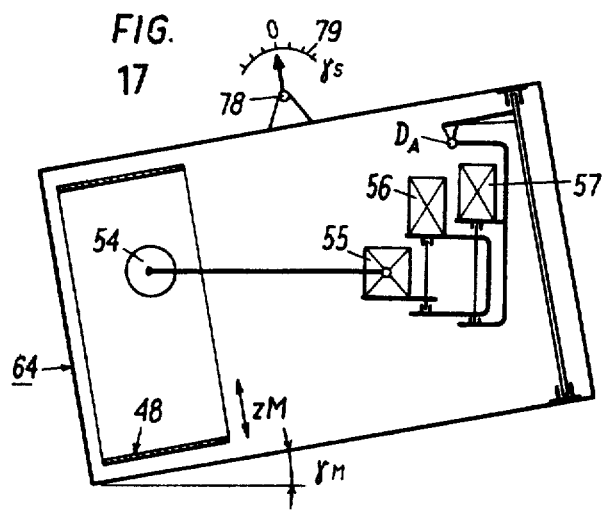
FIG. 17 shows a simulator in shich the swivelling mechanism is suspended from a pivot.

In the embodiment shown in FIG. 17, the model of the swivelling mechanism is pivotally suspended in the simulator 64 from a horizontal pivot $D_A$. The position of the pivot $D_A$ relative to the remaining components of the model of the swivelling mechanism is analogous to the position of the equivalent pivot $D_E$ relative to the tunnel-driving machine. The center of gravity of the entire model of the swivelling mechanism must lie vertically under the axis of the pivot $D_A$ so that a stable suspended position will be obtained. For this purpose, the models of the cutter head and the cutter arm as well as the other movable parts of the part of the simulator which are suspended from the pivot $D_A$ must be mass-balanced to be held in a state of neutral equilibrium in all positions. The cutter head model 54 is vertically adjusted by an adjusting drive 55 in accordance with the actual adjustment of the cutter arm relative to the machine. By means of the adjusting drives 56 and 57 the horizontal pivotal movement of the cutter arm and the horizontal deviation of the machine from the axis of the tunnel profile to be driven is transmitted to the simulator. The tunnel model 48 must now be vertically adjusted to an extent which corresponds to the measured deviation z multiplied with the proportionality factor M. The proportionally factor M will depend on the ratio of the dimensions of the models of the cutter arm and swivelling mechanism to the corresponding dimensions in the tunnel-driving machine. If the model of the swivelling mechanism is suspended from the pivot $D_A$ by a universal joint, the simulator 64 can directly proportionally indicate the uphill or downhill angle as well as the roll angle. In the embodiment shown in FIG. 17, the entire simulator is pivoted on an axis 78 which is parallel to the transverse axis of the tunnel-driving machine and the simulator can be fixed in any adjusted angular position. A constant uphill angle $\gamma_s$ can be taken into account in that the simulator 64 is pivotally moved about the axis 78 and is fixed in a position that deviates from the zero position of a scale 79. In order to prevent an undesired pendulum movement caused by shakes of the machine or very short pitching movements, such angular vibrations are desirably minimized by a shock absorber (vane movable in oil or against an air cushion, eddy current brake) provided at the pivot $D_{A'}$. In the arrangement described, any angular deviation $\pm\gamma_M$ of the machine will be corrected immediately as the housing 64 of the simulator moves in unison with the machine and the model of the swivelling mechanism remains in its position under the influence of gravitation.

Figure 18:
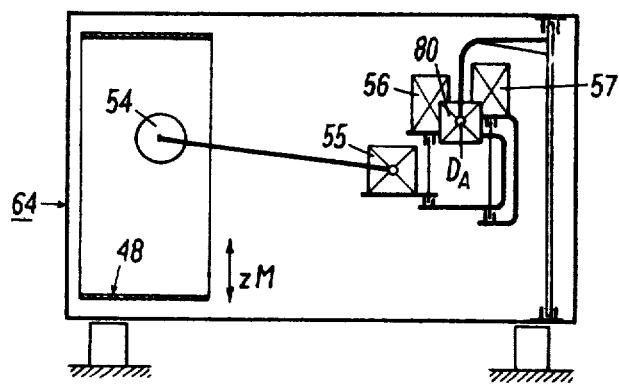
FIG. 18 shows a different embodiment in which the model of the swivelling mechanism can be pivotally moved by a proportional drive.

In the embodiment shown in FIG. 18, an adjusting drive 80 is provided in addition to the adjusting drives 55, 56 and 57 and in dependence on the values measured by an inclinometer or angle encoder imparts to the model of the swivelling mechanism a pivotal movement about an equivalent pivot $D_A$, which corresponds to the equivalent pivot of the machine provided with the measuring instrument. In the embodiment shown in FIG. 18 the housing of the simulator 64 is rigidly secured to the machine and its position cannot be changed. The model of the swivelling mechanism is rotatable within the housing of the simulator on a horizontal pivot $D_A$, which should be as close as possible to the center of gravity of the model of the swivelling mechanism and in the horizontal direction should have a position corresponding to the position of the receiver in the horizontal direction. The adjusting drive 80 may consist, e.g., of a stepping motor or servomotor and is used to impart a pivotal movement to the entire model of the swivelling mechanism.

Figure 19:
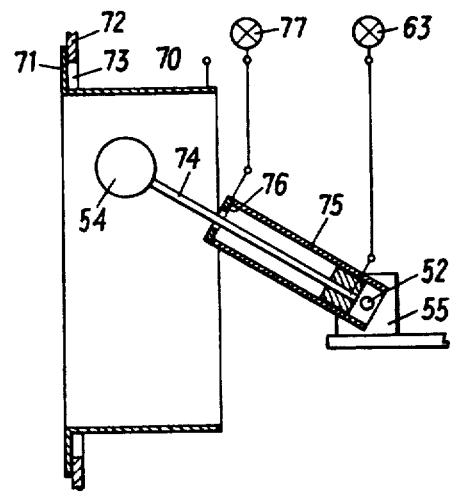
FIG. 19 shows a preferred embodiment of the model of the cutter arm.

In the embodiment shown in FIG. 19, resiliently suspended tunnel profile template is replaced by a rigid tunnel template 70, which consists of a tube that is open at both ends. The tube may consist of sheet metal and is provided at one end with an outwardly directed flange 71. To improve the contact with the cutter head model 54, the inside surface of the tunnel template 70 may have an electrodeposited coating, e.g., of silver. The inside cross-section of the tunnel profile template 70 corresponds to the desired profile of the tunnel to be driven.

The flange 71 of the tunnel profile template 70 is secured to a template carrier 72, which consists of a thicker sheet metal and is formed with an aperture 73, which with the selected scale factor corresponds to the largest possible profile. The template representing the profile to be cut in any given case is inserted into the aperture 73 and is secured therein.

Figure 12:
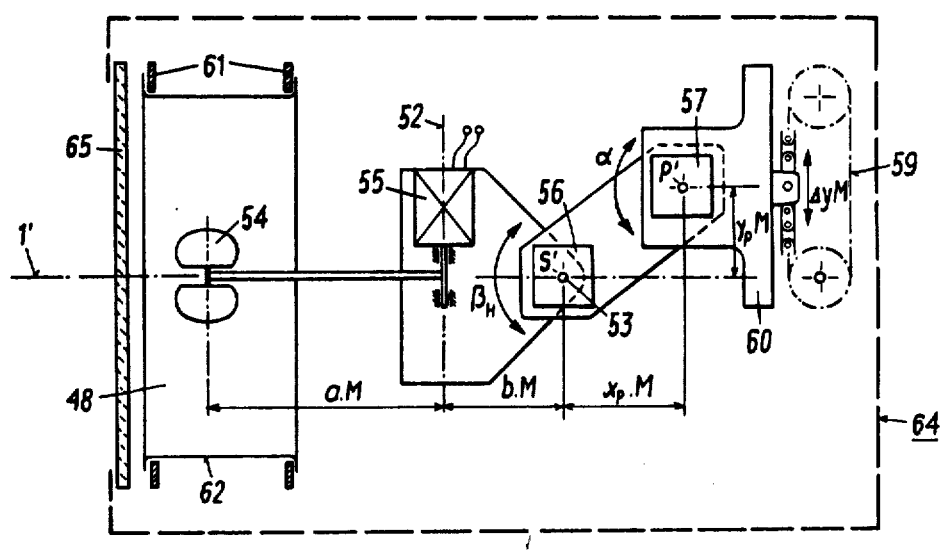

The cutter head model 54 is secured to a flexible rod 74, which at one end is clamped in a tube 75. The tube 75 is provided at its open end with an annular contact surface 76 and is pivoted at its other end to the adjusting drive 55. A pivotal movement is imparted to the tube 75 in the manner described with reference to FIGS. 11 and 12.

When the cutter head model 54 contacts the tunnel profile template 70, a circuit will be closed so that a first signal 63 will be generated, which indicates that the profile boundary has been reached. If that signal is inadvertently or intentionally disregarded, a continued pivotal movement of the cutter arm model will deform the flexible rod 74 in accordance with its bend line and after a certain deflection will contact the annular contact area 76 at the end of the tube 75. This will close another circuit so that a second signal 77 will be generated. The annular gap between the contact surface 76 and the rod 74 is a measure of the permissible overcut. The second signal will indicate that the permissible overcut has been performed. It will be apparent that different widths of said gap can be selected to permit different overcuts. Additional signals may be generated in case of need in that additional contact rings are provided or the tube can be buckled.

Each contact-making operation may signal that the profile boundary has been reached or has been exceeded by a predetermined extent and may also be used to stop the swivelling drive of the tunnel-driving machine.

We claim:

1. In a tunnel-driving machine having a cutter arm mounted at one end on the machine by means of a swiveling mechanism which pivots the cutter arm for swinging movement about a horizontal axis and a vertical axis and a rotatable cutting tool carried by the other end of the cutter arm for engagement with the breast of a tunnel; a system for monitoring the movement of the cutting tool comprising means for generating a focussed electromagnetic wave train aligned with the tunnel axis; a wave train reciever; means mounting the receiver for displacement transversely to the longitudinal axis of the machine and for pivotable movement between a position in which the receiver is parallel to the longitudinal axis of the machine to a position aligned with the wave train axis; a simulator which includes a three-dimensional model of that part of the desired tunnel profile adjacent the breast of the tunnel, a three-dimensional model of the cutter arm and cutting tool mounted on a three-dimensional model of the swiveling mechanism, an adjusting drive for swinging the cutter arm model analogously to the cutter arm; means mounting the swiveling mechanism model for displacement and/or pivotal movement, an adjusting drive for the swiveling mechanism model; sensors for detecting the displacement and/or pivotal angle of the receiver and the cutter arm; and means responsive to the sensors for controlling the adjusting drives.

2. A system as in claim 1 wherein the receiver includes an elongated sensor element which extends transversely to the longitudinal axis of the tunnel-driving machine and in the vertical direction, and wherein the receiver is pivoted on the longitudinal axis of the sensor element.

3. A system as in claim 2 wherein the receiver is provided with a sighting device which procedes the receiver in the direction toward a transmitter and includes a slot that is parallel to the longitudinal axis of the sensor element and is defined by parts which are permeable to electromagnetic waves.

4. A system as in claim 2 wherein a graduated scale extending in the longitudinal direction of the sensor element of the receiver is arranged beside the sensor element and a pointer is displaceable and guided along that scale.

5. A system as in claim 4 wherein the model of the desired profile of the tunnel is mounted in the simulator to be vertically displaceable and the vertical displacement of the desired profile is coupled to the displacement of the pointer which is slidable along the vertical scale of the receiver.

6. A system as in claim 1 wherein the receiver comprises an adjusting hydraulic drive for imparting the pivotal movement and the transverse displacement.

7. A system as in claim 5 wherein the adjusting hydraulic drive for transversely displacing the receiver is connected to the latter by a chain drive.

8. A system as in claim 1 wherein the adjusting movement of the receiver is transmitted to the model of the swiveling mechanism in the simulator by rotary potentiometers, angle encoders, inclinometers, angular position detectors, positioning motors, stepping motors or flexible shafts.

9. A system as in claim 1 wherein the inscribed envelope or enveloping surface of the desired profile or of the model of the tunnel in the simulator and the model of the cutter head are electrically conductive and are electrically connected to a visual and/or audible signal generator.

10. A system as in claim 1 wherein the model of the desired profile of the tunnel in the simulator includes elastically yieldable material or is resiliently mounted.

11. A system as in claim 1 wherein the three-dimensional model of the swiveling mechanism is pivoted on a pivotal axis by a universal joint.

12. A system as in claim 11 wherein the model of the swiveling mechanism is pivotally suspended from a pivot in the simulator and the movable parts of the model of the swiveling mechanism and of the model of the cutter arm are statically balanced.

13. A system as in claim 11 wherein the model of the swiveling mechanism is driven by at least one proportional drive.

14. A system as in claim 11 wherein the simulator is mounted on the tunnel-driving machine to be pivotally movable on an axis that is parallel to the transverse axis of the tunnel-driving machine and the simulator is adapted to be fixed in its adjusted angular position.

15. A system as in claim 1 wherein the cutter arm model includes a tube and a rod which extends through one end of the tube, wherein the cutter head model is connected to the free end of the rod, wherein the tube is pivoted to the model of the swiveling mechanism, and wherein the rod is mounted to be movable out of its central position, in which it is coaxial to the tube, under the action of forces exerted on the cutter head model.

16. A system as in claim 15 wherein the inscribed envelope or envelope surface of the desired profile or of the model of the tunnel in the simulator and the cutter head model are electrically conductive and electrically connected to a visual and/or audible signal generator, wherein the rod and the cutter head model are electrically conductive and connected to a voltage source at least in that region which is capable of colliding with the open end of the tube or the envelope surface of the desired profile, and wherein a lead connected to the open end of the tube is connected to a signal generator which is separate from the signal generator that is associated with the envelope surface of the desired profile.

17. A system as in claim 15 wherein the rod extending through the tube is gripped inside the tube and is flexible.

* * * * *